United States Patent [19]

Fudala

[11] Patent Number: 4,482,120

[45] Date of Patent: Nov. 13, 1984

[54] 6-WAY MANUAL SEAT ADJUSTER

[75] Inventor: Chester S. Fudala, Troy, Mich.

[73] Assignee: Ferro Manufacturing Corporation, Southfield, Mich.

[21] Appl. No.: 419,938

[22] Filed: Sep. 20, 1982

[51] Int. Cl.³ ............................................. F16M 13/00
[52] U.S. Cl. .................................. 248/372.1; 248/394; 248/421; 297/325
[58] Field of Search ...................... 248/371, 372.1, 393, 248/394, 395, 396, 397, 398, 421; 297/313, 325, 329

[56] References Cited

U.S. PATENT DOCUMENTS

| | | | |
|---|---|---|---|
| 2,227,764 | 1/1941 | Saunders et al. | 248/397 |
| 3,662,984 | 5/1972 | Robinson et al. | 248/394 |
| 3,692,271 | 9/1972 | Homier et al. | 248/421 X |
| 4,190,225 | 2/1980 | Bauer et al. | 248/394 |
| 4,285,487 | 8/1981 | Kazaoka et al. | 248/394 X |
| 4,325,527 | 4/1982 | Berneking | 248/394 |

FOREIGN PATENT DOCUMENTS 2409579  9/1975  Fed. Rep. of Germany ...... 248/396

Primary Examiner—J. Franklin Foss
Assistant Examiner—David L. Talbott
Attorney, Agent, or Firm—Barnes, Kisselle, Raisch, Choate, Whittemore & Hulbert

[57] ABSTRACT

A six-way vehicle seat construction adapted to adjust the seat vertically, horizontally, and tilting in opposite directions about a transverse axis. The adjustments are effected or controlled by forces applied to the vehicle seat by an occupant, and are permitted by disengaging latch means which permits selective tilting of the seat by raising or lowering the front or rear edges of the seat in a pivoting motion about transverse axes adjacent the rear or front seat edges, respectively. Rearward tilting, resulting from raising the front edge or lowering the rear edge by the seat occupant, is facilitated by forces applied to the seat back. Counter-balance means apply forces tending to tilt the seat forwardly.

5 Claims, 4 Drawing Figures

U.S. Patent  Nov. 13, 1984  4,482,120
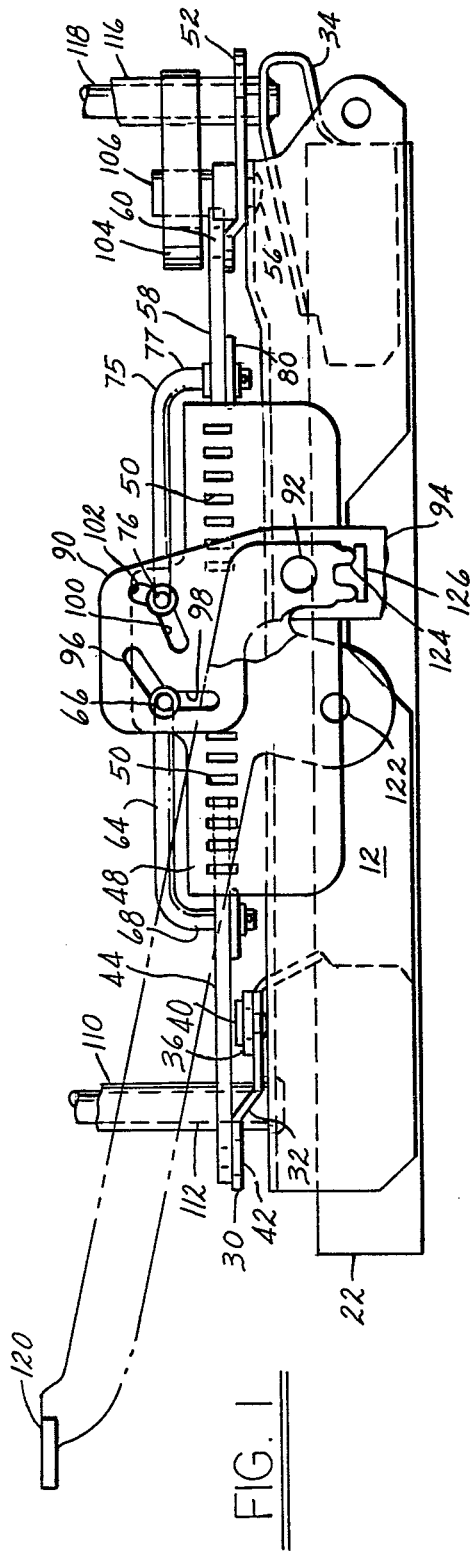
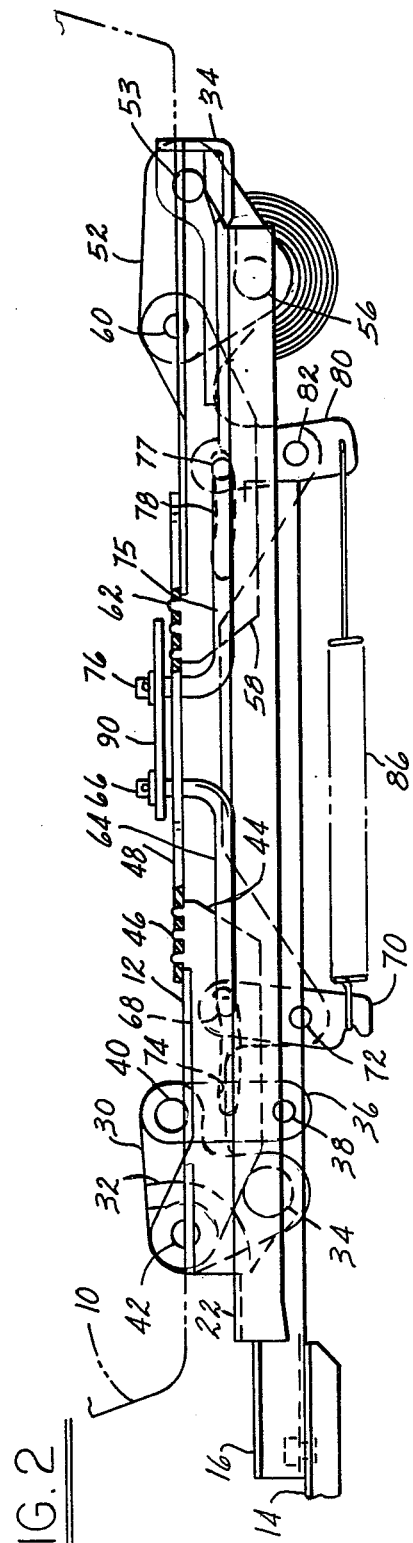
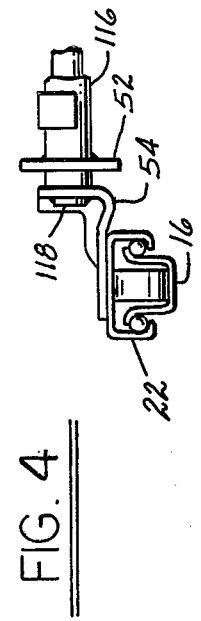
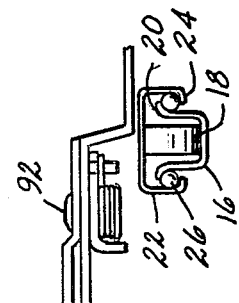

6-WAY MANUAL SEAT ADJUSTER

BRIEF SUMMARY OF THE INVENTION

The seat construction disclosed herein is designed primarily for use in automotive vehicles, but its use is not so limited. It is of the type referred to as six-way, which means that it may be adjusted forwardly or rearwardly, up and down generally vertically, and tilted forwardly or rearwardly from an intermediate position.

The seat construction is designed to be operated or controlled solely in response to forces applied to the seat and seat back by the occupant of the seat. Thus no motor is required.

In general terms, this is accomplished by mounting a lower support on rails which extend longitudinally of the vehicle, and an upper longitudinally extending seat support which overlies the lower support and is connected thereto at its front and rear end by lift arms which are pivotally connected to both supports. A pivoted link is provided in the connection between said supports at one end, to accommodate generally up and down movement of either end of the seat support about a pivot axis adjacent the other end of the seat support without binding.

Manually releasable latch means are provided which when engaged retain the lift arms in fixed position and thus retain the seat in whatever adjusted position is desired. The latch means comprises separate, independently operated latches, and a single manual control is provided for selective release or reengagement of the latches. When one of the latches and corresponding lift arm are engaged and the other latch and corresponding lift arm are released, the seat support may be tilted about the axis of its pivot connection to lift arm whose latch remains engaged.

Each latch comprises an elongated latch link pivoted to one of said lift arms, and selectively engageable with a stationary latch member. The latch link preferably is provided at one end with a plurality of pawl teeth engageable in selected openings in a latch plate which constitutes the stationary latch member of both latches.

The control for the latches comprises a manually operated pivoted actuating plate having arcuate slots therein concentric with its pivot axis, and actuating links having end portions slidable in said slots. In intermediate position, with both latches engaged, the end portions of the actuating links are at opposite ends of the slots, so that upon swinging of the plate in opposite directions from its intermediate position, only one of said actuating links is operated, the end portion of the other sliding in its arcuate slot.

In order to release each latch link and to provide for movement thereof relative to the latch plate, each latch link is provided with a longitudinally extending slot receiving the other end portions of the actuating links. These other end portions of the actuating links are pivoted to short guide release levers, so that the levers guide the other end portions of the actuating links transversely of the slots in the latch links, and thus pivots the latch links about their pivot connections to the lift arms to disengage the pawl teeth on the latch links from the latch plate.

This permits up and down adjustment of the ends of the upper seat support, which effects longitudinal movement of the latch links relative to the latch plate. The guide levers are connected by a tension spring, and when the actuating plate is centered, the latch links are engaged and the seat remains locked in adjusted position.

The structure illustrated and described herein is provided at one side of the seat. A similar support is provided at the opposite side, except that the latching structure is omitted. Torque tubes interconnect the pivoted lift arms at opposite sides of the seat to insure smooth operation.

The lower support is adjustable longitudinally of the vehicle, but this adjustment is conventional. However, it is noted that this is also actuated or controlled by forces applied directly to the seat by its occupant, so that full six-way adjustment by forces applied to the seat directly by the occupant is achieved.

BRIEF DESCRIPTION OF THE DRAWINGS

FIG. 1 is an elevational view of the seat, as viewed from the left (outboard) side.

FIG. 2 is a plan view of the structure of FIG. 1.

FIG. 3 is an end elevation as viewed from the left in FIG. 2.

FIG. 4 is an elevation as viewed from the right in FIG. 2.

DETAILED DESCRIPTION

Referring now to the drawings, the seat assembly comprising a seat indicated in dot and dash lines in FIG. 2 at 10 is fixed to an elongated upper support 12. Secured to the floor of the vehicle by brackets 14 is a rail or track 16 of upwardly open U-shape which receives rollers 18. Rail 16 has outwardly directed flanges 20. A lower support or slide 22 overlies the rail 16 and has inwardly directed flanges 24. Balls 26 are interposed between flanges 20 and 24. This construction for providing fore and aft seat adjustment is conventional.

The forward end of upper support 12 is connected to the lower support 22 by lift arm 30. The lift arm is in the form of a bell crank formed from flat stock by bending at 32 as best seen in FIG. 1.

Lift arm 30 provided with a pivot connection 34 with the upper seat support 12. A generally vertical rigid link 36 is connected to the lower support 22 by a pivot connection 38 at its lower end and its upper end has a pivot connection 40 to lift arm 30. Link 36 is provided to prevent jamming as the ends of upper supports are raised or lowered independently as will later appear.

It will be seen that as the forward end of support 12 is raised from its down position as illustrated in FIG. 2, it will be tilted about a pivot axis adjacent its rear end, and that as a result of the connection provided by link 36, lift arm 30 will pivot about pivot connection 40.

In order to lock the front edge of the seat in adjusted position, the bell crank which forms the arm 30 has a pivot connection 42 with an elongated latch link 44 having pawl teeth 46 at its other end. A latch plate 48 having a series of tooth receiving openings 50 is carried by the upper support 12. When the teeth 46 are received in openings 50, the lift arm 30 is retained against rotation about pivot 40 and the forward end of the upper support 12 is held against up and down movement.

A similar lift and latch mechanism is provided for the rear end of said upper support, and comprises lift arm 52, and pivot 53 connecting arm 52 to bracket 54 which is fixed to the rear end of lower support 22. In this case, pivot 56 connects the rear end of upper support 12 directly to the lift arm 52.

Elongated latch link 58 is connected by pivot 60 to the bell crank which forms lift lever 52. At its forward end, latch link 58 is provided with pawl teeth 62 which extend into a second set of the aligned openings 50 at the rear end of latch plate 48.

Latch release mechanism is provided for both the forward and rear latches. The forward release mechanism comprises an actuating link 64 in the form of a rod having its opposite ends 66 and 68 bent to extend at 90° to the intermediate portion of the rod, and to each other. A guide lever 70 has a pivot connection 72 to the upper support and at its upper end has a pivot connection with the forward end 68 of actuating link 64. The end 68 of link 64 extends through an elongated slot 74 provided in the latch link 44. As the actuating link 64 is moved rearwardly by means later to be described, the guide lever 70 guides the end 68 of actuating link 64 in an arc about pivot 72, which causes the portion of the end 68 of the actuating link in the slot 74 to swing latch link 44 downwardly about pivot 42, thus withdrawing teeth 46 from openings 50 and releasing the forward latch. At this time the forward edge of the seat may be moved generally up or down, which adjustment will be accompanied by fore and aft movement of the latch link 44, which is permitted by the elongated slot 74. It will be noted that slot 74 is curved slightly downwardly throughout its forward portion.

The latch release mechanism for the rear edge of seat and the rear end of upper support 12 is similar, and comprises actuating link 75 having end portions 76, 77, latch link 58 provided with slot 78, guide lever 80 pivoted at 82 to the upper support, the actuating link 75 having its rear end portion 77 movable in slot 78. As before, longitudinal movement of actuating link 75 (forwardly, in this instance) causes its rear end portion 77 to be guided downwardly in an arcuate path about pivot 82 to swing latch link 58 downwardly about its pivot 60 and to withdraw teeth 62 from the openings 50.

Guide levers 70 and 80 have their lower ends interconnected by a tension spring 86 which tends to restore latch links 44, 58 to latching engagement with latch plate 48.

The latch actuator plate 90 is pivoted to the upper support by pivot 92 and includes a laterally extending handle, a portion of which is seen at 94, by means of which the seat occupant may swing the plate 90 clockwise or counterclockwise from the intermediate position illustrated in FIG. 1. Plate 90 has an elongated slot having an arcuate idler portion 96 and angularly related actuating camming portion 98 which forms a continuation of arcuate portion 96. The slot is dimensioned to receive the end portion 66 of actuator link 64. With the parts in the position shown in the Figures, the seat is locked in its down position, and rod end 66 is at the junction of the continuous slot 96, 98. The plate 90 is provided with a second slot having an arcuate idler portion 100 concentric with pivot 92 and an angularly related actuating camming portion 102. With parts in the down position shown, rod end 76 is located at the juncture of slot portions 100, 102.

Movement of the handle 94 forwardly swings plate 90 clockwise. Actuator link 75 is not moved, since rod end 76 moves in arcuate slot 100. However, rod end 66 is engaged by the left side of slot portion 98 as seen in FIG. 1, and link 64 is moved to the right. Its rod end 68, which is received both in the pivot connection to the guide lever 70 and the slot 74 in latch link 44, is guided downwardly in an arcuate path by guide lever, which swings latch link 44 about its pivot 42 to withdraw pawl teeth 46 from the openings 50 in stationary latch plate 48. With the lift arm 30 unlatched, the forward end of upper support 12 can be raised by the seat occupant leaning back against the seat back, thus applying a force tending to tilt the seat rearward about a pivot adjacent its rear edge while raising its forward edge. When the seat is in the desired position the occupant restores the handle 94 to intermediate position, and spring 86 will urge the teeth 46 into the openings 50 which are adjacent to the teeth in the adjusted position.

When handle 94 is moved rearwardly, plate 90 is swung counterclockwise and rod end 76 is moved forwardly by the right hand edge of slot portion 102, thus moving actuating link 75 forwardly. Rod end 77 is guided in an arc about the pivot 82 of guide lever 80, latch link 58 is pivoted about pivot 60, and teeth 62 are withdrawn from openings in latch plate 48. This frees lift lever 52, and the rear edge of the seat and the rear end of upper support 12 may be raised by the occupant or by a counterbalance spring as controlled by the seat occupant.

The counterbalance spring is seen in FIG. 1 at 104 mounted on stud 106 which also forms the pivot between the upper support 12 and the lift arm 52.

In order to insure identical operation at opposite sides of the seat, the lift arms or bell cranks 30, 52 are connected by torque tubes to identically operating lift arms at the inboard or right hand seat edge. Arm 30 at the front is rigidly connected to torque tube 110. Tube 110 receives a support rod 112 which forms the pivot 34 between lift arm 30 and the upper support 12. As the forward end of support 12 is moved upwardly from the down position illustrated in the Figures, arm 30 is pivoted about pivot 40, and torque tube 112 swung in an arc about pivot 40 and is fixed against rotation relative to lift arm 30. Thus motion of the corresponding lift arm at the inboard side of the seat is caused to be identical to that of arm 30.

The arrangement at the rear of the seat is different but produces the same results. Here torque tube 116 is fixed to the lift arm 52, and support rod 118 is fixed, as by welding to bracket 54 mounted on lower slide or support 22. Rod 118 together with tube 116 thus constitutes the stationary pivot mounting 53 of the lift arm 52. Upon vertical movement of the rear end of top support 12, torque tube 116 rotates and effects identical rotation to a corresponding lift arm at the inboard side of the seat construction whose shape and mounting is identical with lift arm 52.

Counterbalance spring 104 applies a clockwise bias to lift arm 52, as viewed in FIG. 2, and this may be of a magnitude sufficient to raise the rear end of the upper supports with a resultant forward tilting of the seat. This may be controlled by the occupant applying a rearward pressure to the seat back opposing such tilting.

The seat construction may be adjusted longitudinally of the vehicle by adjusting the lower supports 22 to slide along rails 16 on rollers 18. This adjustment is conventional, and includes a handle 120 pivoted to the lower support at 122, and including latch fingers 124 engageable with an elongated longitudinally extending latch rack, a portion of which is seen at 126.

It will be seen that the seat construction described provides a six-way adjustment, fore and aft, up and down, and forward or rearward tilting. From the untilted lower position illustrated, the seat may be tilted forwardly or rearwardly by elevating the rear or forward edge respectively. It may be moved to fully raised position by tilting upper supports in the opposite direction from the initial tilting adjustment. Since these four adjustments all involve tilting, it will be understood that they are readily accomplished or controlled primarily by force applied by the seat occupant to the seat back.

I claim:

1. Adjustable vehicle seat support structure for a vehicle seat having a seat and seat back comprising an upper elongated generally horizontal seat support, a lower support below said upper support, pivot arms at opposite ends of said supports pivotally connected between said supports and tiltable upon raising or lowering the corresponding end of said upper support, an individually releasable latch for each arm preventing tilting thereof when engaged, each of said arms when latched constituting a substantially stationary pivot for the corresponding end of said upper support to provide for control of tilting of said upper support by force applied to the seat or seat back by the occupant of the vehicle seat, each of said individually releasable latches comprising a rigid latch link pivoted at one end to the corresponding pivot arm, a stationary latch member, means providing for latching engagement between the other end of said latch link and said latch member in a plurality of different positions of said latch link and the pivot arm to which it is pivoted, a selector plate pivotable by an occupant of the seat in opposite directions from an intermediate position in which both of said latches are engaged, actuator links independently movable by said selector plate, means connecting each actuator link to a corresponding latch link and operable to disengage said latch link from said stationary latch member to provide for movement of said latch link by movement of the pivot arm to which it is connected occasioned by movement of the seat by forces applied thereto by its occupant, said selector plate having a pair of elongated openings each having an arcuate idler portion concentric with the pivot axis of said plate, and a connected camming portion inclined to said idler portion, said actuator links having end portions received and slidable in said openings, said end portions of said links being located at the junctions between said idler portions and said inclined camming portions when both of said latches are engaged, said openings being disposed so that upon pivoting of said plate in either direction, the end portion of one of said links moves in the arcuate idler portion while the end portion of the other link is movable along the inclined camming portion to be moved thereby to release the corresponding latch.

2. Seat support structure as defined in claim 1, in which said latch links are provided with elongated longitudinally extending slots separated from the pivot connection between the ends of said latch links and said pivot arms in which the ends of said actuating links remote from said plate are slidably received, guide release levers pivoted to said upper support, the last mentioned ends of said actuating links being pivoted to said guide release levers as well as being slidable in the slots in said latch links, said guide release levers being operable when pivoted by said actuating links to guide the ends of the actuating links received in the elongated slots in said latch links transversely of the slots in arcuate paths about the axes of said guide release levers to disengage the corresponding latch links from said stationary latch member.

3. Seat support structure as defined in claim 2, in which said actuating links are rods with end portions bent to extend perpendicular to each other, the ends of said rods remote from said plate being pivotally connected to said guide release levers and extending through said elongated slots in said lift levers.

4. Structure as defined in claim 1, in which said openings in said plate are adjacent each other and at approximately the same radial direction from the pivot axis of said plate.

5. Adjustable vehicle seat support structure for a vehicle seat having a seat and seat back comprising an upper elongated generally horizontal seat support, a lower support below said upper support, pivot arms at opposite ends of said supports pivotally connected between said supports and tiltable upon raising or lowering the corresponding end of said upper support, an individually releasable latch for each arm preventing tilting thereof when engaged, each of said arms when latched constituting a substantially stationary pivot for the corresponding end of said support to provide for control of tilting of said upper support by force applied to the seat or seat back by the occupant of the vehicle, each of said individually releasable latches comprising a rigid latch link pivoted at one end to the corresponding pivot arm, a stationary latch member, means providing for latching engagement between the other end of said latch link and said latch member in a plurality of different positions of said latch link and the lift arm to which it is pivoted, a selector member movable by an occupant of the vehicle seat in opposite directions from an intermediate position in which both of said latches are engaged, actuator links independently movable by said selector member, and means connecting each actuator link to a corresponding latch link and operable to disengage said latch link from said stationary latch member while providing for movement of said latch link by movement of its pivot arm occasioned by movement of said seat by forces applied thereto by said occupant, the means connecting each actuator link to a corresponding latch link comprising an elongated longitudinally extending slot in each latch link, a guide release lever pivoted to said upper support, one end portion of the corresponding actuating link extending through said slot and being pivotally connected to said guide release lever, said guide release lever being operable when pivoted by said actuating link to guide the end portion of the actuating link received in the elongated slot in the corresponding latch link transversely of the slot to pivot the latch link about its pivot connection to the corresponding pivot arm to disengage the latch link from said stationary latch member.

* * * * *